United States Patent [19]

Burrows et al.

[11] 4,286,432

[45] Sep. 1, 1981

[54] LOCK VALVE WITH VARIABLE LENGTH PISTON AND HYDRAULIC SYSTEM FOR A WORK IMPLEMENT USING THE SAME

[75] Inventors: J. W. Burrows, Yates City; Loyal O. Watts, Mapleton, both of Ill.

[73] Assignee: Caterpillar Tractor Co., Peoria, Ill.

[21] Appl. No.: 93,072

[22] PCT Filed: Aug. 30, 1979

[86] PCT No.: PCT/US79/00664

§371 Date: Aug. 30, 1979

§102(e) Date: Aug. 30, 1979

[87] PCT Pub. No.: WO81/00600

PCT Pub. Date: Mar. 5, 1981

[51] Int. Cl.3 .......... F16D 31/02

[52] U.S. Cl. .......... 60/404; 60/416; 60/484; 91/420; 91/461

[58] Field of Search .......... 91/420, 461; 92/75; 60/404, 416, 484

[56] References Cited

U.S. PATENT DOCUMENTS

| | | | |
|---|---|---|---|
| 2,506,008 | 5/1950 | Arps | 60/471 |
| 2,765,622 | 10/1956 | Hill | 60/433 |
| 3,264,947 | 8/1966 | Bidlack | 91/167 |
| 3,857,404 | 12/1974 | Johnson | 137/102 |
| 3,872,670 | 3/1975 | Dezelan | 60/413 |
| 3,908,515 | 9/1975 | Johnson | 91/420 |
| 3,908,687 | 9/1975 | Wood | 91/420 |
| 3,933,167 | 1/1976 | Byers, Jr. | 91/420 |
| 4,033,236 | 7/1977 | Johnson | 60/445 |
| 4,081,053 | 3/1978 | Sherman | 91/420 |
| 4,192,338 | 3/1980 | Gerulis | 91/420 |

FOREIGN PATENT DOCUMENTS 2535751 2/1977 Fed. Rep. of Germany .

*Primary Examiner*—Abraham Hershkovitz
*Attorney, Agent, or Firm*—Sixbey, Bradford & Leedom

[57] ABSTRACT

A lock valve (10) for use in a hydraulic system (90) for positioning the work implement of an earth working machine which includes first and second check valves (28, 30) and a piston section (60, 70, 62, 72) for each operable by pilot fluid. In a first mode, the piston sections (60, 70, 62, 72) permit seating of both check valves, while in a second mode, the piston sections interlock so that only one check valve can seat. The lock valve (10) operates in a hydraulic system (90) to lock a work implement, such as a blade for a motor grader, in a fixed position during a first operating mode, while providing a connection from one end of an implement actuator to vent during a second operating mode to insure that a shock absorbing means for the implement hydraulic system maintains a full shock absorbing capacity.

20 Claims, 2 Drawing Figures

LOCK VALVE WITH VARIABLE LENGTH PISTON AND HYDRAULIC SYSTEM FOR A WORK IMPLEMENT USING THE SAME

DESCRIPTION

1. Technical Field

This invention relates to a hydraulic control system for the work implement of a motor grader which is selectively operable to control the work implement in both a fine grading and a rough grading operating mode, and to a lock valve for use in such system which is adapted to perform the dual functions of both a conventional lock valve and a longstem lock valve to insure a full implement shock absorbing capacity in the system for the rough grading operating mode.

2. Background Art

Earth working and moving machines often have operating implements, such as grader blades, which are controlled by hydraulic circuits selectively activated at the option of an operator of the machine. In motor graders for example, the work implement consists of a blade which is used in basically two different operating modes, one for rough grading and the other for fine grading. In the fine grading mode, the blade or implement is maintained in a fixed position, whereas in the rough grading mode, the system preferably includes means to absorb the shocks which result from the implement or blade encountering hard immovable objects such as rocks which might be embedded in the soil.

The grader blade for earth working or grading machines is normally maintained in the fixed position fine grading mode for relatively long periods of time to produce a level road surface. To accomplish and maintain accurate blade positioning, the hydraulic system for the grader blade normally includes lock valves in the hydraulic circuit for the blade lift jacks which control blade elevation. Such lock valves are normally positioned between a control valve and the corresponding lift jack, and serve to block fluid flow from the jack when the control valve is in a neutral or working position. With fluid flow from the lift jacks blocked, the blade is held in a fixed position and is unable to drift.

During rough grading operations, a motor grader can travel at relatively high speeds, and the implement or blade can frequently encounter immovable objects such as rocks etc. Thus the lock valves which were used in the fixed position operating mode must be deactivated or the blade will be prevented from moving at impact and damage to both the blade and related components may result. When the lock valves are deactivated, it is desirable to activate a shock absorbing system to absorb large forces which may be experienced by the grader blade upon contact with immovable objects.

The combination of a lock valve - shock absorbing system for earth working machines is shown and described in detail in U.S. Pat. No. 3,872,670 issued Mar. 25, 1975, to Joseph E. Dezelan et al. This patent discloses lock valves of the type referred to which include a pair of ball type check valves provided with pilot pressure actuated pistons for selectively moving the check valves away from a seated position against a spring bias. Another somewhat similar lock valve structure is disclosed in U.S. Pat. No. 3,857,404 issued Dec. 31, 1974 to Howard L. Johnson.

As shown in the Johnson patent, a lock valve may include a one-way choke means which cooperates with a metering means to control fluid flow from the hydraulic blade lift jacks. This combination effectively controls blade movement but does create a back pressure in the hydraulic line from the lift jack to the lock valve. Also, it has been found that in systems which include lock valves in combination with shock absorbing accumulators, it is possible, when the lock valve closes, to trap high pressure in the head ends of the blade lift jack cylinders. Since these head ends are connected to shock absorbing accumulators when the grader blade is set for rough grading, this trapped high pressure greatly reduces the effective volume of oil in an accumulator and thus correspondingly decreases the ability of the accumulator to effectively cushion shock.

In an attempt to enhance accumulator effectiveness, separate longstem lock valves have been added to the lock valve - accumulator combination which controls a work implement during a shock absorbing mode of operation. These longstem lock valves include dual check valves with an elongated piston to insure that one check valve always remains open, and are of the general type illustrated in German Pat. DT25 35 751 of Feb. 17, 1977, U.S. Pat. No. 2,506,008 issued May 2, 1950 to B.J. Arps and U.S. Pat. No. 2,765,622 issued Oct. 9, 1956, to D. R. Hill, et al. The longstem lock valves are connected in a system to ensure that the flow from one end of the actuator is always allowed to pass through while preventing flow from the other end of the actuator.

DISCLOSURE OF THE INVENTION

The present invention is directed to an improved lock valve for use in a hydraulic system for controlling the work implement of an earth moving machine which operates to positively lock the work implement in a fixed position in one operational mode and which operates as a longstem lock valve to ensure effective shock absorbtion in a second operating mode.

The present invention further provides a novel lock valve having first and second check valves disposed within a valve housing with pilot fluid operable piston means slidably disposed therebetween. The piston means includes a split piston formed so that in a first condition, the piston means permits both check valves to be simultaneously seated. In a second extended position, the piston means permits only one of the check valves to be seated and causes the lock valve to operate as a longstem lock valve. This is accomplished by interlock means which lock together the sections of the split piston and cause them to move within the valve housing as a unitary piston.

In one aspect of the present invention, a hydraulic system is provided for selectively controlling a work implement during either a shock absorbing mode or a fixed position mode of operation. This system includes a hydraulic circuit having lock valve means operable to provide positive locking for the work implement in the fixed position mode by blocking fluid flow from both the head and rod ends of a lift jack cylinder. In the shock absorbing mode, the head end of the lift jack cylinder is connected to an accumulator and the head end is also vented to a supply tank by the lock valve means operating as a long stem lock valve. This releases to the tank all residual pressure on the end of the lift jack cylinder which is in communication with the accumulator.

The present invention further provides a novel hydraulic system for controlling the blade of a motor grader wherein the known combination of lock valves and accumulators are employed to lock the grader blade during a fine grading operation while the accumulators are brought into operation to cushion blade induced shock during a rough grading operation. To permit full use of the accumulator oil volume at the accumulator pre-charge setting, a novel lock valve for each blade lift jack cylinder is employed. This lock valve includes two seated check valves to lock the head and rod ends of a blade lift jack cylinder during a fine grading operation in the manner of conventional lock valves. However for a rough grading operation, a split piston is extended until the two portions thereof interlock to cause one of the two valves to always remain open. During the rough grading operation when the accumulator cushioning action is employed, the open check valve in each lock valve vents the head end of the associated blade lift jack cylinder to a supply tank, thus compensating for residual pressure developed in the head end of such cylinder during a blade positioning operation. The accumulator connected to the head end of such cylinder is now permitted to operate with the accumulator oil volume at the full effective shock absorbing capability to provide effective blade cushioning.

Additional objects, advantages and features of the invention will be more readily apparent from the following detailed description of a preferred embodiment of the invention when taken together with the accompanying drawings.

BEST MODE FOR CARRYING OUT THE INVENTION

Figure 1:
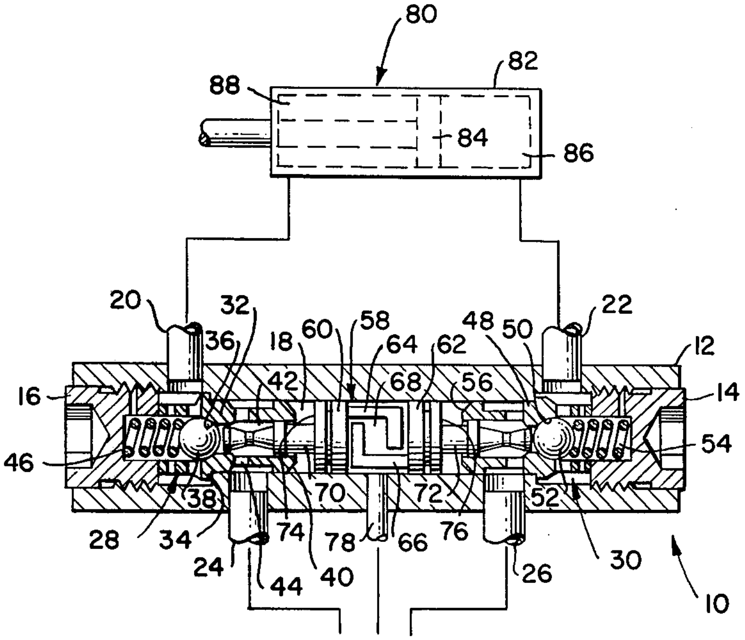
FIG. 1 is a cross sectional view of the lock valve of the present invention with a schematic representation of a lift jack system connected thereto.

Referring now to FIG. 1, it will be noted that the novel lock valve of the present invention indicated generally at 10 includes an open ended valve housing 12. The ends of the valve housing are closed by end plugs 14 and 16 which operate with the valve housing to define an internal bore 18. The end plugs may be threaded into the valve housing as indicated in FIG. 1, or may be press fit or otherwise inserted and secured within the ends of the valve housing.

A first pair of laterally spaced valve outlet ports 20 and 22 communicate with opposite ends of the valve bore 18, while a second pair of laterally spaced valve inlet ports 24 and 26 also communicate with the valve bore and are disposed intermediate the first pair of ports 20 and 22.

The lock valve 10 includes two identical spring biased ball check valve assemblies 28 and 30 which are positioned at opposite ends of the valve bore 18. The check valve assembly 28 is positioned to control fluid flow between the valve ports 20 and 24 while the check valve 30 is positioned to control fluid flow between the valve ports 22 and 26. The check valve assembly 28 includes a seating insert 32 which is secured within the valve bore 18 and rests against a shoulder 34 formed in the inner surface of the housing 12. One end of the seating insert 32 provides a valve seat 36 for a ball valve 38 while the opposite end of the seating insert provides a piston stop surface 40. The seating insert has a central bore 42 and fluid openings 44 are formed in the body of the seating insert to communicate between the central bore 42 and the valve port 24.

The check valve assembly 28 is completed by a spring 46 which extends between the end plug 16 and the ball valve 38 to bias the ball valve against the valve seat 36.

As previously indicated, the check valve assembly 30 is identical in structure to the check valve assembly 28, and includes a seating insert 48 which provides a valve seat 50 for a ball valve 52. The ball valve is biased against the valve seat by a spring 54, and the inner most face of the seating insert provides a piston stop surface 56.

The lock valve 10 is a pilot operated valve which includes a piston assembly 58 having pistons 60 and 62 which form a split piston unit. These pistons are slidably disposed in the valve bore 18, and include opposing radial faces which are provided with projecting travel limiting members 64 and 66. These travel limiting members operate with the ball valves 38 and 52 seated to separate the pistons 60 and 62 and provide a fluid chamber 68 there between.

The opposite shoulders 74 and 76 of the pistons 60 and 62 are provided with axial plungers 70 and 72 respectively which extend through the central bore in the seating inserts 32 and 48 to selectively unseat the ball valves 38 and 52. Each of the axial plungers is provided with an enlarged annular shoulder which, with the ball valves seated, is positioned within the central bore of the seating inserts 32 and 48 adjacent the piston stop surfaces 40 and 56 thereof. These annular shoulders are a little smaller than the inner diameter of the central bores of the seating inserts and provide a dampening effect on the fluid in chamber 42. The axial plungers 70 and 72 are of decreased diameter in the area between the shoulders 74 and 76 and the ends of the plungers.

A pilot port 78 communicates with the chamber 68 so that pilot fluid can be supplied or removed from the chamber to control the operation of the pistons 60 and 62.

To illustrate the operation of the lock valve 10, the valve is shown in FIG. 1 in combination with a double acting hydraulic cylinder or ram 80 which may be of the type employed as a lift jack for the working implement of an earth moving vehicle. The hydraulic cylinder or ram includes an enclosed cylinder 82 and a piston 84 movable within the cylinder in response to a pressure differential between the head end of the cylinder 86 and the rod end 88. The rod end of the cylinder is connected by a fluid line to the valve port 20 while the head end of the cylinder is connected by a fluid line to the valve port 22.

With the lock valve 10 in the condition illustrated in FIG. 1, no pilot fluid pressure is being provided through the pilot port 78 to the chamber 68, and the springs 46 and 54 cause the ball valves 38 and 52 to seat against the valve seats 36 and 50. In this mode, the lock valve 10 is operating to lock the piston 84 in position, for no fluid is permitted to flow from either the head end 86 or the rod end 88 of the cylinder 82 through the lock valve 10.

Assuming that the double acting hydraulic cylinder 80 is a conventional lift jack, positioning of a work implement or other element connected to the lift jack may be accomplished by providing fluid to either the head or rod ends of the cylinder 82 while discharging fluid from the opposite end. Also, pilot fluid under pressure can be provided through the pilot port 78 to the chamber 68, and when the chamber is sufficiently pressurized, the pistons 60 and 62 are moved outwardly to an extent permitted by the travel limiting members 64 and 66. These members are shown as opposed "L" shaped units in FIG. 1 wherein the free ends of the units contact to prevent further outward movement of the pistons. It should be understood that any structural interlock configuration can be secured to the pistons 60 and 62 to provide this travel limiting function and limit outward movement of the pistons as well as inward movement to preserve the chamber 68. For example, this function could be provided by two interlocked loops mounted on the pistons, a single telescoping member having the ends thereof secured to the pistons, or a number of other travel limiting structures. It is important that the interlock members be such as to permit both the pistons 60 and 62 to move within the bore 18 as a single piston once the interlock has been accomplished.

The outward movement of the pistons 60 and 62 in response to pilot fluid pressure in the chamber 68 is terminated before the pistons contact the piston stops 40 and 56. Consequently, with the piston travel limiting members engaged and the chamber 68 pressurized, the split piston structure will now move as a single unitary unit due to the fluid pressure in the chamber 68. The members 64 and 66 are formed so that the length of this unitary piston is such that only one of the ball valves 38 or 52 is permitted to be seated, and therefore simultaneous seating of both ball valves is prevented when the pistons are extended apart to the extent permitted by the travel limiting members. Thus the extended pistons with their axial plungers 70 and 72 transform the lock valve 10 into a longstem lock valve.

After the pistons 60 and 62 have been extended apart, the piston 84 may be repositioned by introducing fluid under pressure into either the valve port 24 or the valve port 26. If fluid under pressure is introduced through the valve port 26, this fluid will pass around the ball valve 52 and into the head end 86 of the cylinder 82. At the same time, the fluid pressure against the shoulder 76 will force the interlocked piston assembly to the left in FIG. 1 to insure that the ball valve 38 is unseated. This will permit fluid to be discharged from the rod end 88 of the cylinder 82, through the valve port 20, around the ball valve 38, and out through the valve port 24.

To move the piston 84 in the opposite direction, fluid under pressure is introduced through the valve port 24 to unseat the ball valve 36 and to operate against the shoulder 74 to force the piston assembly to the right in FIG. 1. This results in the introduction of fluid into the rod end 88 of the cylinder 82 while fluid is discharged form the head end 86 through the valve port 22, around the ball valve 52, and out through the valve port 26.

Figure 2:
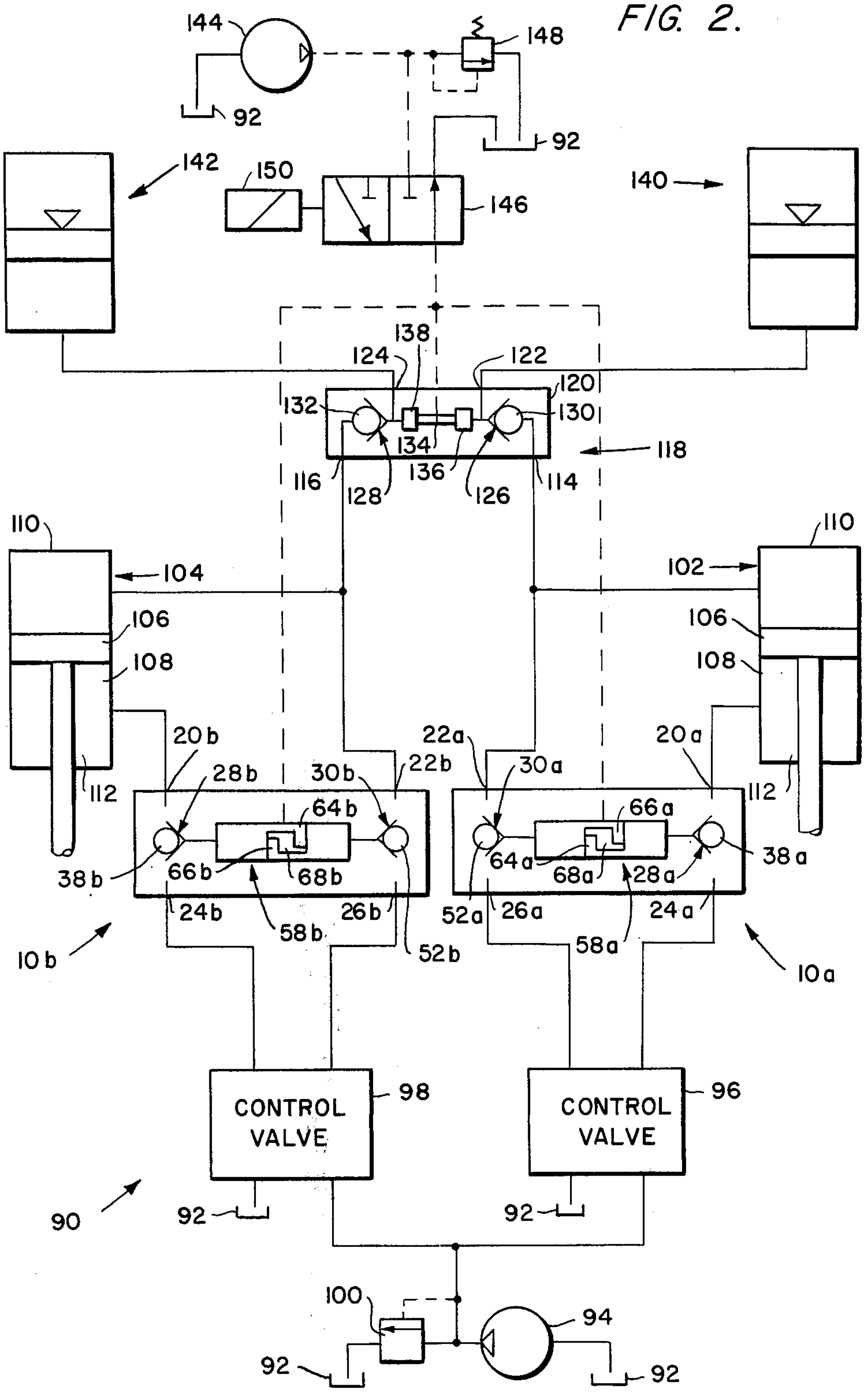
FIG. 2 is a schematic diagram of a hydraulic control system which is an embodiment of the present invention.

The lock valve 10 of the present invention is particularly adapted for use with a novel hydraulic control system indicated generally at 90 in FIG. 2. This hydraulic control system includes a fluid supply tank which has been labeled with a single reference numeral 92, although the tank is shown schematically at several different positions in the drawing. In actual use, a single supply tank 92 is normally employed, and fluid for the hydraulic control system 90 is drawn from the tank by means of a pump 94. The output of this pump is connected to control valves 96 and 98 which receive pressurized fluid from the pump and selectively provide fluid to either raise or lower a working implement. Each of these control valves is a conventional control valve of a type known to the prior art which may be selectively activated to direct fluid to or from either end of a double acting hydraulic lift jack connected to move a working implement. For example, a control valve of the type suitable for use as the control valves 96 and 98 is shown in U.S. Pat. No. 4,033,236 to Howard L. Johnson et al.

The control valves operate selectively to direct fluid to a selected end of a lift jack while permitting fluid from the opposite end of the lift jack to return to the tank 92. Fluid under pressure from the pump 94 is thereby enabled to drive the lift jack to position the working implement controlled thereby. The upper pressure level for such fluid is regulated by a relief valve 100 which is connected between the output of the pump 94 and the tank 92.

A pair of conventional lift jacks 102 and 104 are employed to raise or lower the working implement controlled by the hydraulic system 90. Each jack constitutes a double acting hydraulic jack having a piston 106 which divides the interior of a lift jack cylinder 108 into a head end 110 and a rod end 112. A lock valve 10 of the type shown in FIG. 1 is connected between one of the control valves 96 and 98 and the head and rod ends of one of the lift jacks 102 and 104 as indicated at 10A and 10B in FIG. 2. For clarity of description, the components of the lock valves shown schematically at **10*a* and 10*b* in FIG. 2 will bear the same reference numerals as corresponding components in FIG. 1** plus the identifying letter "a" or "b" to identify the lock valve with which the component is associated.

It will be noted from FIG. 2 that the inlet ports **24*a*, 26*a* and 24*b*, 26*b* of the lock valves 10*a* and 10*b* are connected respectively to the control valves 96 and 98, while the outlet ports 20*a*, 22*a* and 20*b*, 22*b* of the lock valves are connected respectively across the rod and head ends of the lift jacks 102 and 104. Also, the head ends 110 of the lift jacks 102 and 104 are connected to outlet ports 114 and 116 respectively of a lock valve 118. This lock valve is a conventional lock valve having structural features which are illustrated in U.S. Pat. No. 3,872,670. Basically, this lock valve 118 includes a cylindrical housing 120 defining a valve bore which communicates with the outlet ports 114 and 116. Also communicating with the valve bore are laterally spaced inlet ports 122 and 124, and fluid flow between the inlet and outlet ports is controlled by a pair of identical spring biased ball check valve assemblies 126 and 128. The ball check valve assembly 126 includes a normally seated ball valve 130 which is interposed between the inlet and outlet ports 114 and 122, while the ball valve assembly 128 includes a normally seated ball valve 132 which is interposed between the inlet port 116 and the outlet port 124. Thus, the ball valves 130 and 132** normally block fluid flow from the associated outlet to inlet ports.

The head ends 110 of the lift jacks 102 and 104 may be connected respectively to shock absorbing accumulators 140 and 142 by the lock valve 118. These accumulators are of a well known type, such as the gas charge fluid accumulators conventionally used for shock absorbtion in hydraulic systems.

Operation of the lock valves **10*a*, 10*b*, and 118 is accomplished simultaneously by a pilot system having fluid lines depicted as broken lines in FIG. 2 to distinguish the pilot system for the main hydraulic system. This pilot system includes a pilot pump 144 which provides for fluid under pressure from the tank 92 to a two position solenoid operated valve 146. The output of the pilot pump is also connected to a relief valve 148 which vents the pilot system to the tank 92 if excessive pressure is developed in the pilot system. The pilot system alternatively may be provided with pressurized fluid from the main pump 94, in which case, the pilot pump 144 and relief valve 148** would be eliminated.

The solenoid operated valve 146 is controlled by a solenoid 150 which moves the valve between two valve positions. In the first position as shown in FIG. 2, the solenoid operated valve 146 blocks the flow of pressurized pilot fluid from the pilot pump 144 to the chambers 68*a*, 68*b*, and 134 of the lock valves 10*a*, 10*b*, and 118. In this first position of the solenoid operated valve, the valve connects these lock valve chambers directly to the tank 92. Thus, the ball valves 38*a*, 52*a*, 38*b*, 52*b*, 130 and 132 are all seated.

The ball valves 130 and 132 may be unseated and the lock valves 10*a* and 10*b* caused to operate as longstem lock valves by positioning the solenoid operated valve 146 through action of the solenoid 150 in the second valve position. In this position, fluid under pressure from the pump 144 is directed to the pilot chambers 68*a*, 68*b* and 134. This results in operation of the pistons 136 and 138 to unseat both of the ball valves 130 and 132 so that the accumulators 140 and 142 are connected to the head ends 110 of the lift jacks 102 and 104. At the same time, the pistons of the lock valves 10*a* and 10*b* are extended and interlocked by the locking members 64*a*, 66*a*, 64*b*, and 66*b*, thereby causing these lock valves to operate as longstem lock valves which vent the ends of the lift jacks 102 and 104 which are in communication with the accumulators to the tank 92.

INDUSTRIAL APPLICABILITY

The control valves 96 and 98 may be operated in the conventional manner to provide fluid under pressure from the pump 94 to either the head ends or the rod ends of the lift jacks 102 and 104. When the lift jacks are being employed in this manner to position a working implement, the solenoid valve 146 is positioned in the manner shown in FIG. 2 to block fluid flow from the pilot pump 144. Therefore, if, for example, fluid is being provided to the head ends 110 of the lift jacks, this fluid is directed by the control valves 96 and 98 through the inlet ports 26*a* and 26*b* to unseat the ball valves 52*a* and 52*b*. The same fluid forces the piston assemblies 58*a* and 58*b* in the opposite direction of the ball valves 52*a* and 52*b* in FIG. 2 to unseat the ball valves 38*a* and 38*b*. Therefore, fluid will now flow around the ball valves 52*a* and 52*b* and into the head ends 110 of the lift jacks 102 and 104, while fluid will be discharged from the rod ends 112 and passed around the open ball valves 38*a* and 38*b* to the inlet ports 24*a* and 24*b*, the control valves 96 and 98, and the tank 92. It should be noted that the closed lock valve 118 prevents fluid from reaching the accumulators 140 and 142, for the pressure of the fluid entering the outlet ports 114 and 116 acts to force the ball valves 130 and 132 against the valve seats therefor.

The same procedure may be employed to move the pistons 106 of the lift jacks 102 and 104 in the opposite direction, except in this situation the control valves 96 and 98 provide fluid under pressure around the ball valves 38*a* and 38*b* to the rod ends 112 of the lift jacks.

Once the pistons 106 of the lift jacks 102 and 104 have been properly positioned, the control valves 96 and 98 are moved to the neutral position to block fluid flow from the pump 94, and the ball valves 38*a*, 38*b*, 52*a*, and 52*b* reseat. Now the lock valves 10*a* and 10*b* operate as conventional lock valves to block all fluid flow from the head and rod ends of the lift jacks 102 and 104. The seated ball valves 130 and 132 of the lock valve 118 prevent fluid flow to the accumulators 140 and 142, while fluid pressure through the outlet valve ports 20*a*, 20*b*, 22*a*, and 22*b* operates only to enhance the seating pressure against the ball valves 38*a*, 38*b*, 52*a* and 52*b*. This locks the pistons 106 in place for a fine grading operation.

To accomplish cushioned blade operation, the shock absorbing accumulators 140 and 142 are connected to the head ends 110 of the lift jacks 102 and 104. Also, to enhance the shock absorbing ability of the accumulators, it is necessary to vent the head ends of the lift jacks to the tank 92 so that residual pressure in the head ends is removed. This residual pressure can be trapped in the head ends of the lift jacks when the pistons 106 are repositioned and the lock valves 10*a* and 10*b* are closed. Such residual pressure opposes the precharged setting of the accumulators 140 and 142 and will operate to greatly reduce the effective volume of the accumulators and thereby the shock absorbing capabilities thereof if the residual pressure is not vented.

To bring the accumulators 140 and 142 into operation for cushioned blade operation, the solenoid valve 146 is positioned to provide pilot fluid under pressure from the pump 144 to the pilot chambers 134, 68*a*, and 68*b*. The pistons 136 and 138 will now move apart to unseat the ball valves 130 and 132 to directly connect the accumulators to the head ends 110 of the lift jacks 102 and 104. Simultaneously, the piston assembly 58*a* and 58*b* will move to the extended position causing the ball valves 52*a* and 52*b* to become unseated, thereby permitting residual pressure in the head ends 110 of the lift jacks 102 and 104 to bleed back through the control valves 96 and 98 to the tank 92. The control valves, when in a neutral position, provide a limited bleed path to the tank 92, for the ports of the control valves leading to the tank are not completely closed. This may be observed by referring to FIG. 3 of the aforementioned U.S. Pat. No. 4,033,236 wherein it will be noted that the port 82 of the control valve shown is slightly opened.

With the piston assemblies 58*a* and 58*b* extended and locked, the ball valves 38*a* and 38b will initially tend to remain seated due to the fluid pressure exerted upon these ball valves from the rod ends 112 of the lift jacks. This rod end fluid pressure would normally be greater than the head end fluid pressure due to the weight of the working implement on the piston 106.

Other aspects, objects and advantages of this invention can be obtained from a study of the drawings, the disclosure and the appended claims.

We claim:

1. An expandable piston lock valve (10) adapted to operate both as a lock valve and a longstem lock valve comprising a valve housing (12) defining an internal valve chamber (18), a pair of spaced valve inlet ports (24,26) in said valve housing (12) communicating with said valve chamber (18), a pair of spaced valve outlet ports (20,22) in said valve housing (12) communicating with said valve chamber (18), first normally closed check valve means (28) interposed between a first valve inlet and outlet port (24,20) to control the flow of fluid therebetween, second normally closed check valve means (30) interposed between a second valve inlet and outlet port (26,22) to control the flow of fluid therebetween, variable length piston means (58) mounted between said first and second check valve means (28,30) for operation in a first mode to permit both said first and second check valve means (28,30) to close simultaneously in the absence of fluid pressure supplied to either one of said pair of inlet ports (24,26) and in a second mode to prevent said first and second check valve means (28,30) from both closing simultaneously either in the presence or absence of fluid pressure supplied to either one of said pair of inlet ports (24,26), said variable length piston means (58) in said first mode having a first predetermined length and in said second mode expanding to a second predetermined length greater than said first predetermined length, and actuation means (68,78) for causing said variable length piston means (58) to expand from said first predetermined length to said second predetermined length.

2. The expandable piston lock valve (10) according to claim 1 wherein said variable length piston means (58) includes a first piston unit (60) and a second piston unit (62) mounted for relative movement within said valve chamber (18) and piston travel limiting means (64, 66) mounted on said piston means between said first and second piston units (60, 62).

3. The expandable piston lock valve (10) according to claim 2 wherein said piston travel limiting means (64,66) act with said variable length piston means (58) in said first mode to space said first and second piston units (60,62) so as to define a pilot fluid chamber (68) therebetween and said actuation means includes a pilot fluid port (78) communicating with said pilot fluid chamber (68).

4. The expandable piston lock valve (10) according to claim 3 wherein pilot fluid pressure in said pilot chamber (68) causes said first and second piston units (60,62) to move apart such that said variable length piston means (58) expands to said second predetermined length for operation in said second mode, said piston travel limiting means (64,66) limiting the extent of the relative movement of said piston units (60,62) to said second predetermined length and said variable length piston means (58) operating as a unitary unit in said second mode.

5. The expandable piston lock valve (10) according to claim 4 wherein first and second spaced piston stop means (40,56) are mounted within said valve chamber (18) to engage said variable length piston means toward said first and second check valve means (28,30), said piston travel limiting means (64,66) operating to limit the length of said variable length piston means (58) to said second predetermined length so as to permit said variable length piston means to move as a unitary unit between said first and second spaced piston stop means (40,46).

6. The expandable piston lock valve (10) according to claim 2 wherein said first and second piston units (60, 62) each include a piston (60,62) slideably disposed in said valve chamber (18), plunger means (70, 72) extending from a first face of said piston toward an adjacent one of said first and second normally closed check valve means (28, 30), and piston travel limiting means (64, 66) extending from a second face of said piston (60, 62) opposite to said first face.

7. The expandable piston lock valve (10) according to claim 6 wherein the second face of the piston (60) for said first piston unit (60) is positioned adjacent to and spaced from the second face of the piston (62) for said second piston unit (62), the piston travel limiting means (64) of said first piston unit (60) contacting the second face of the piston (62) for said second piston unit (62) and the piston travel limiting means (66) of said second piston unit (62) contacting the second face of the piston (60) for said first piston unit (60) when the variable length piston means (58) is operating in said first mode to sapce the pistons (60,62) so as to define a pilot fluid chamber (68) therebetween, and said actuation means includes a pilot fluid port (78) communicating with said pilot fluid chamber (68).

8. The expandable piston lock valve (10) according to claim 7 wherein pilot fluid pressure in said pilot chamber (68) operates to move the pistons (60,62) of said first and second piston units (60,62) apart to expand said variable length piston means (58) from said first predetermined length to said second predetermined length, one of said plunger means (70 or 72) operating to open one of said check valve means (28 or 30) when said variable length piston means (58) expands to said second predetermined length.

9. The expandable piston lock valve (10) according to claim 8 wherein the piston travel limiting means (64,66) of said first and second piston units (60,62) engage when said variable length piston means (58) expands to said second predetermined length such that further relative movement between the pistons (60,62) of said first and second piston units is prevented until fluid pressure is removed from said pilot fluid chamber (68).

10. The expandable piston lock valve (10) according to claim 9 wherein said first and second normally closed check valve means (28, 30) each include a valve seat (36, 50) secured within said valve chamber (18) between an inlet and outlet port, a ball valve (38, 52) mounted to seat against said valve seat (36, 50), spring bias means (46, 54) extending between said ball valve (38, 52) and said valve housing (12) to bias said ball valve against said valve seat (36, 50), and piston stop means (40,56) mounted within said valve chamber (18) to engage and limit movement of said variable length piston means (58) toward said ball valve (38, 52).

11. A hydraulic system (90) for controlling the work element of an earth working machine comprising hydraulic motor means (102,104) for moving said work element, fluid source means (92,94,96,98) for providing fluid to said hydraulic motor means (102,104), shock absorbing means (140,142) including fluid accumulator means (140,142), and valve means (10*a*,10*b*,118) connected with said fluid source means (92,94,96,98) and said hydraulic motor means (102,104) and operative in a first mode to cause said hydraulic motor means to hold said work element in a fixed position and in a second mode to connect said hydraulic motor means to said fluid accumulator means (140,142), said valve means (10*a*,10*b*,118) including at least a first extendable piston lock valve means (10*a*) connected between said fluid source means (92,94,96) and said hydraulic motor means (102) and operative in said first mode to cause said hydraulic motor (102) means to hold said work element in a fixed position and in said second mode to relieve residual pressure on said hydraulic motor means, said first extendable piston lock valve means (10*a*) adapted to operate both as a lock valve and a longstem lock valve and including a valve housing (12) defining an internal valve chamber (18), a pair of spaced valve inlet ports (24,26) in said valve housing (12) communicating with said valve chamber (18), a pair of spaced valve outlet ports (20,22) in said valve housing (12) communicating with said valve chamber (18), first normally closed check valve means (28) interposed between a first valve inlet and outlet port (24,20) to control the flow of fluid therebetween, second normally closed check valve means (30) interposed between a second valve inlet and outlet port (26,22) to control the flow of fluid therebetween, variable length piston means (58) mounted between said first and second check valve means (28,30) for operation in a first mode to permit both said first and second check valve means (28,30) to close simultaneously in the absence of fluid pressure supplied to either one of said pair of inlet ports (24,26) and in a second mode to prevent said first and second check valve means (28,30) from both closing simultaneously either in the presence or absence of fluid pressure supplied to either one of said pair of inlet ports (24,26), said variable length piston means (58) in said first mode having a first predetermined length and in said second mode expanding to a second predetermined length greater than said first predetermined length, and actuation means (68,78) for causing said variable length piston means (58) to expand from said first predetermined length to said second predetermined length.

12. The hydraulic system (90) according to claim 11 wherein said valve means (10*a*, 10*b*, 118) includes a lock valve means (118) connected between said hydraulic motor means (102) and said accumulator means (140), said lock valve means (118) being operative to selectively connect said hydraulic motor means (102) to said accumulator means (140).

13. The hydraulic system (90) according to claim 11 wherein said hydraulic motor means (102, 104) includes a lift jack (102) having a lift jack cylinder (108), a piston 106 mounted for movement within said lift jack cylinder, said piston (106) dividing said lift jack cylinder (108) into a head end (110) and a rod end (112), said first extendable piston lock valve means (10*a*) being operative in said first mode to prevent fluid flow from the head and rod ends (110, 112) of said first jack cylinder (108).

14. The hydraulic system (90) according to claim 11 wherein one of the valve outlet ports (20*a*) of said first extendable piston lock valve means (10*a*) is connected to the rod end (112) of said lift jack (102) and the remaining outlet port (22*a*) is connected to the head end (110) of said lift jack, the inlet ports (24*a*, 26*a*) of said first extendable piston lock valve means (10*a*) being connected to said fluid source means (92, 94, 96).

15. The hydraulic system (90) according to claim 14 wherein the extendable piston means (58*a*) of said first extendable piston lock valve means (10*a*) includes a first piston unit (60*a*) and a second piston unit (62*a*) mounted for relative movement within said valve chamber (18*a*) and piston travel limiting means (64*a*, 66*a*) mounted on said piston means (58*a*) and operating to permit limited relative movement between said first and second piston units (60*a*, 62*a*), said piston travel limiting means (64*a*, 66*a*) operating with said piston means (58*a*) in the non-extended position to space said first and second piston units (60*a*, 62*a*) so as to define a pilot fluid chamber (68*a*) therebetween, said valve housing (12*a*) including a pilot fluid port (78*a*) communicating with said pilot fluid chamber (68*a*), and said valve means (10*a*, 10*b*, 118) including pilot fluid control means (144, 146) connected to said pilot fluid port (78*a*) for selectively providing pilot fluid under pressure to said pilot fluid chamber (68*a*) to move said first and second piston units (60*a*, 62*a*) apart to the extended position of said piston means (58*a*), said piston travel limiting means (64*a*, 66*a*) limiting the extent of the relative movement of said piston units (60*a*, 62*a*) to said extended position and said piston means (58*a*) operating as a unitary unit in said extended position.

16. The hydraulic system (90) according to claim 15 wherein said lock valve means (118) is connected between the head end (110) of said lift jack (102) and said accumulator means (140), said lock valve means (118) including normally closed check valve means (126) selectively operable to permit or block fluid flow between the head end (110) of said lift jack (102) and said accumulator means (140), and pilot fluid responsive means (134, 136, 138) connected to said pilot fluid control means (144, 146) and operative in response to the provision of pilot fluid under pressure by said pilot fluid control means to cause said normally closed check valve means (126) to connect the head end (110) of said lift jack (102) to said accumulator means (140).

17. The hydraulic system (90) according to claim 12 wherein said hydraulic motor means (102,104) includes first and second lift jacks (102,104) connected to move said work element, each such lift jack (102,104) including a lift jack cylinder (108) and a piston (106) mounted for movement within said lift jack cylinder, said piston (106) dividing the lift jack cylinder (108) into a head end (110) and a rod end (112), said valve means (10*a*,10*b*,118) including said first extendable piston lock valve (10*a*) connected between the head and rod ends (110,112) of said first lift jack (102), a second extendable piston lock valve (10*b*) identical in structure to said first extendable piston lock valve (10*a*), said second extendable piston lock valve (10*b*) being connected between the head and rod ends (110,112) of said second lift jack (104), and a lock valve (118) connected between the head ends (110) of said first and second lift jacks (102,104) and said accumulator means (140,142), said first and second extendable piston lock valves (10*a*,10*b*) being also connected to said fluid source means (92,94,96,98).

18. The hydraulic system (90) according to claim 17 wherein said lock valve (118) includes first and second inlet ports (122, 124) connected to said accumulator means (140, 142), a first outlet port (114) connected to the head end (110) of said second lift jack (104), a normally closed check valve means (126, 128) interposed between an inlet and outlet port (120, 114 and 124, 116) and selectively operable to permit or block fluid flow therebetween, and pilot fluid operable piston means (136, 138) to open said check valve means (126, 128) in response to the receipt of pilot fluid under pressure by said lock valve (118), said valve menas (10*a*, 10*b*, 118) including pilot fluid control means (144, 146) for selectively providing pilot fluid under pressure to said lock valve (118).

19. The hydraulic system (90) according to claim 18 wherein the valve inlet ports (24*a*, 26*a* and 24*b*, 26*b*) of said first and second extendable piston lock valves (10*a*, 10*b*) are connected to said fluid source means (92, 94, 96, 98), said first extendable piston lock valve (10*a*) having a first outlet port (20*a*) connected to the rod end (112) of the first lift jack (102) and a second outlet port (22*a*) connected to the head end (110) of the first lift jack and said second extendable piston lock valve (10*b*) having a first outlet port (20*b*) connected to the rod end (122) of the second lift jack (104) and a second outlet port (22*b*) connected to the head end (110) of the second lift jack.

20. The hydraulic system (90) according to claim 19 wherein the extendable piston means (58) of said first and second extendable piston lock valve means (10*a*,

10*b*) includes a first piston unit (60) and a second piston unit (62) mounted for relative movement within said valve chamber (18) and piston travel limiting means (64, 66) mounted on said piston means (58) and operating to permit limited relative movement between said first and second piston units (60, 62), said piston travel limiting means (64, 66) operating with said piston means (58) in the nonextended position to space said first and second piston units (60, 62) so as to define a polit fluid chamber (68) therebetween, said valve housing (12) including a pilot fluid port (78) communicating with said pilot fluid chamber (68), the pilot fluid control means (144, 146) of said valve means (10*a*, 10*b*, 118) being connected to said pilot fluid port (78) for selectively providing pilot fluid under pressure to said pilot fluid chamber (68) to move said first and second piston units (60, 62) apart to the extended position of said piston means (58), said piston travel limiting means (64, 66) limiting the extent of the relative movement of said piston units (60, 62) to said extended position and said piston means (58) operating as a unitary unit in said extended position.

* * * * *